Sept. 15, 1936.  H. D. GEYER  2,054,699
STORAGE BATTERY CONTAINER
Filed July 30, 1932   2 Sheets-Sheet 1

Inventor
HARVEY D. GEYER
By Spencer Hardman & Fehr
his Attorneys

Sept. 15, 1936. H. D. GEYER 2,054,699
STORAGE BATTERY CONTAINER
Filed July 30, 1932 2 Sheets-Sheet 2
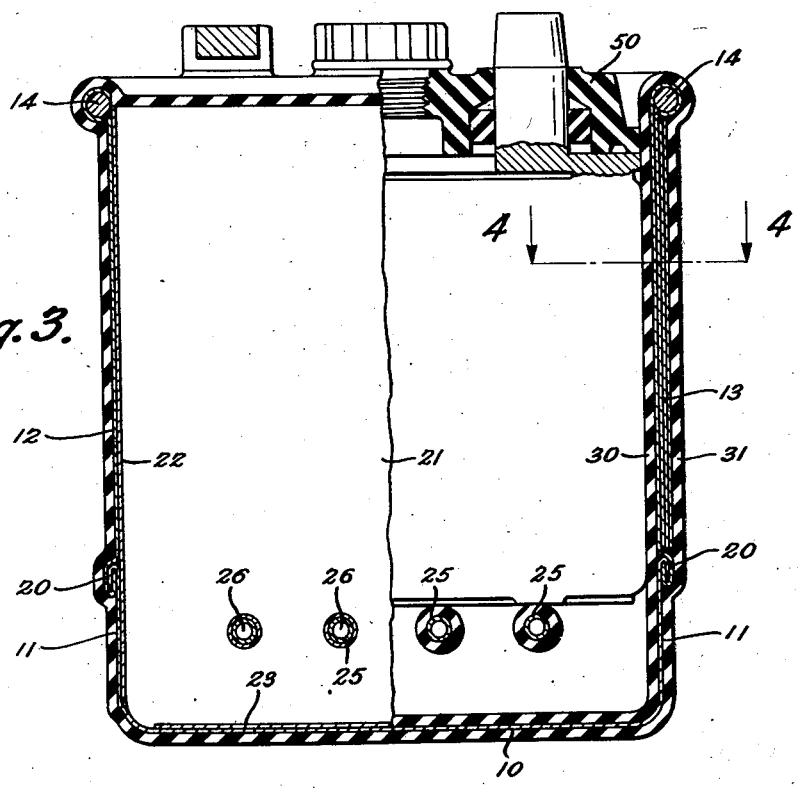
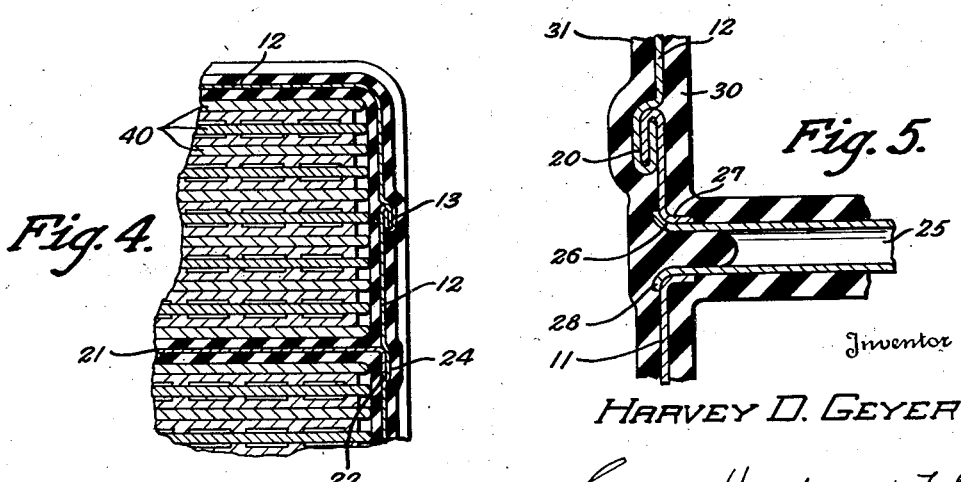
Inventor
HARVEY D. GEYER
By Spencer Hardman & Fehr
his Attorneys Patented Sept. 15, 1936

2,054,699

UNITED STATES PATENT OFFICE 2,054,699

STORAGE BATTERY CONTAINER

Harvey D. Geyer, Dayton, Ohio, assignor, by mesne assignments, to General Motors Corporation, Detroit, Mich., a corporation of Delaware Application July 30, 1932, Serial No. 626,993

2 Claims. (Cl. 136—166)

This invention relates to storage battery containers and the like.

An object of this invention is to provide a very strong and rigid but relatively light container having a plurality of separate cell compartments therein, which is suitable for an automobile storage battery box.

Ordinary present day automobile storage battery boxes are molded in one piece either of hard rubber or of a hard bituminous compound usually containing asbestos or other fiber and a suitable earthy filler. Such present day battery boxes have to be molded with quite thick cell walls in order to have the proper strength to resist sudden shocks and in order to avoid small cracks or flaws in the molded material which would permit the acid electrolyte to leak out or communicate between the separate cells. Hence such thick wall molded containers are necessarily relatively heavy and cumbersome to handle and ship prior to the time the battery plates and electrolyte are assembled therewith. Also such molded containers are always subject to being cracked and ruined by a sudden blow, such as often occurs when a small stone is thrown against the battery box by the automobile tires when traveling at higher speeds.

Hence a more specific object of this invention is to provide a sheet metal reinforced soft rubber battery box which is relatively light in weight compared to the one-piece molded battery boxes, which cannot be cracked by a stone thrown thereagainst or other sudden blow, and which can be economically manufactured.

Another object is to provide such a battery box having rubber covered metal bars or tubes each extending through a plurality of cell compartments adjacent the bottom of the box to serve as battery plate supports, whereby a relatively large unobstructed sediment space is provided in each cell in a simple and economical manner.

Further objects and advantages of the present invention will be apparent from the following description, reference being had to the accompanying drawings, wherein a preferred embodiment of one form of the present invention is clearly shown.

In the drawings:

Fig. 3 is a transverse section on line 3—3 of Fig. 1, the left half of the figure showing the sheet metal partition member uncovered with rubber.

Fig. 4 is a detail sectional view taken on line 4—4 of Fig. 3, showing the lock-seam in the sheet metal side walls and the method of retaining the sheet metal partitions in place.

Fig. 5 is a detail view showing on a larger scale than Fig. 2 how the battery plate supporting tubes are fixed in place and how the soft rubber covers the entire joint and prevents leakage.

Similar reference characters refer to similar parts throughout the several views.

Figure 1:
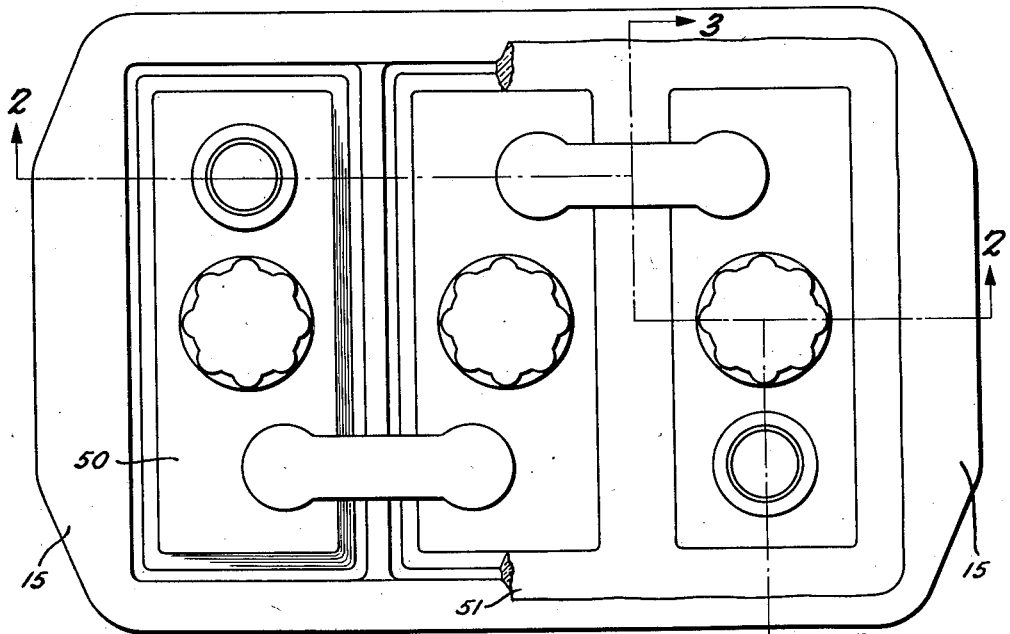
Fig. 1 is a plan view of a three-cell automobile starting battery embodying this invention, the left half of the figure showing the sealing material broken away.
Figure 2:
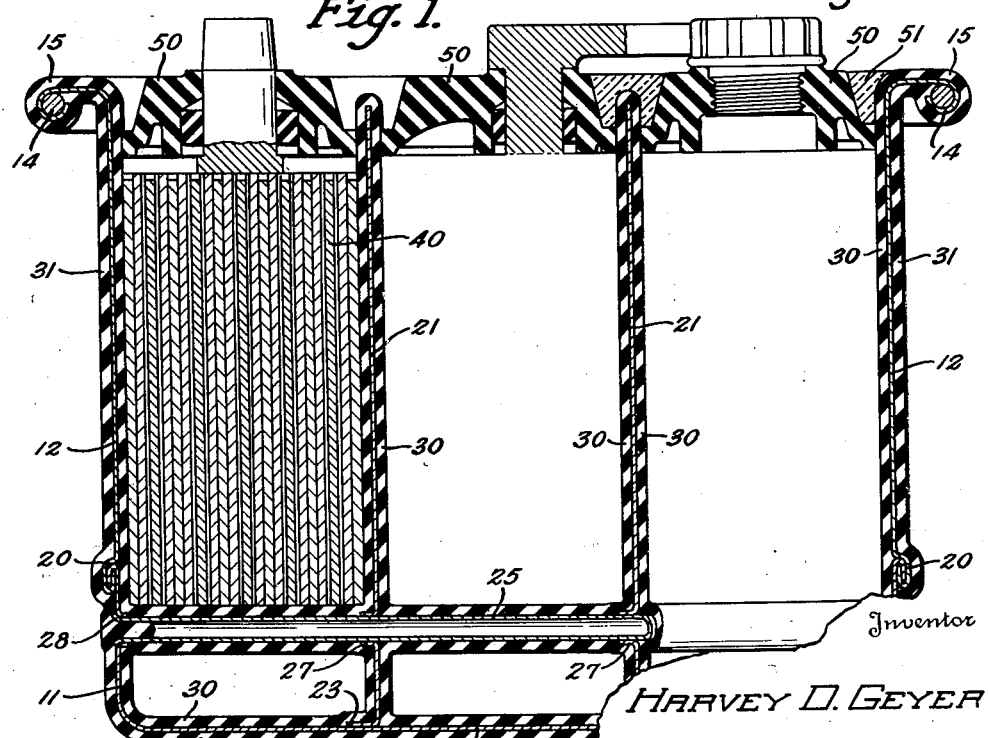
Fig. 2 is a longitudinal vertical section on line 2—2 of Fig. 1, the battery plates being shown only in the left cell.

A one-piece sheet metal bottom 10 is made by drawing out a flat sheet to a cup shape having the raised side portions 11, the corners being easy smooth curves as illustrated. The sheet metal side walls 12 are first separately made from one piece of flat sheet metal by folding the metal around to box shape and lock-seaming the joined edges as shown at 13 (see Figs. 3 and 4). The upper periphery of the side walls 12 are reinforced and stiffened by being bent outwardly around a reinforcing stiff metal wire 14 as clearly illustrated. The wire 14 is continuous around the upper periphery and preferably has its two abutting ends welded together to give greater strength and rigidity. Preferably the wire 14 projects laterally outwardly from the side walls 12 at the two ends of the box as shown in Figs. 1 and 2, and thus provides suitable handles 15 for the battery.

The side wall section of the box having been thus formed, it is joined to the bottom section by the peripheral lock-seam 20 which rigidly fixes these two sections together. The separate sheet metal transverse partitions 21 are formed with flanges 22 at their vertical edges (see Figs. 3 and 4) and a flange 23 at its bottom edge (see Figs. 2 and 3). Partitions 21 are then slipped down into the locating grooves 24 formed in the side walls 12 until the bottom flange 23 abuts the bottom 10. Preferably the flanges 22 and 23 of the partitions are spot welded to the contacting metal walls so that they act as stays to prevent outward bulging of the side walls 12 due to pressure of warped or swelled battery plates after a period of use of the battery.

Aligned holes 26 with small flanges 27 thereon are provided in the partitions 21 and the two outside end walls 12, through which holes the plate supporting tubes 25 are inserted with a fairly snug fit and fixed in place by outwardly flaring the ends of the tubes 25 against the metal end walls as shown at 28 (see Fig. 5). Of course tubes 25 are so located in spaced relation with the bottom 10 as to give the desired sediment deposit space for the material which falls from the battery plates during use. With this very simple and economical construction a large unobstructed sediment space is obtained and no additional plate supports are required in each cell. In the molded battery boxes now in general use a series of integral molded tapered ribs are provided in each cell which extend upwardly from the bottom wall of the box to serve as plate supports. Obviously such tapered ribs occupy a large part of the sediment space and unless they are made quite high the sediment often fills the space after a period of use and contacts and short circuits the plates, thus ruining the cell. With this invention, however, the battery box may have a much larger sediment space with the same height of the box.

The entire metal structure described above is covered with a layer 30, 31 of soft rubber bonded to the metal by vulcanization. This rubber coating completely seals all joints in the metal structure and fully protects the metal from attack by the acid, so that the container described and illustrated comprises in effect three soft rubber cell jars inserted within the three cell compartments of the metal box and an exterior rubber container completely encasing the metal box to protect the exterior surface thereof from rust or corrosion caused by acid spilled or splashed thereupon.

This soft rubber coating is preferably applied to the metal structure by electro-depositing the rubber from a suitable rubber dispersion, either natural or artificial aqueous rubber dispersion, which includes the desired sulfur, vulcanizing accelerator, and/or other suitable ingredients which render the process of depositing the rubber and its subsequent vulcanization to the metal more efficient. A process of electrodeposition of a rubber coating upon a metal object is described in Patent No. 1,476,374, S. E. Sheppard et al., December 4, 1923. During the electrodeposition of the interior rubber coating 30 on the sheet metal container of this invention, the aqueous rubber solution should be kept circulating freely into and out of the cell compartments in order to provide a more uniform thickness of rubber coating 30 throughout the interior of each cell.

If desired the soft rubber coating may be applied from an aqueous rubber dispersion by the well-known dipping method, or any other known method instead of the electrodeposition method. Whatever method is used for depositing the rubber coating it is subsequently vulcanized in situ upon the metal and is firmly bonded thereto so that it adheres strongly and forms in effect a soft rubber battery box which is reinforced throughout all its parts with a quite rigid metal structure. Thus a relatively light and very strong battery box is obtained which cannot be cracked by sudden blows. Both the cell partitions 21 and end walls 12 are yieldable under high pressure so that in case the battery plates 40 warp or swell after a period of use the confining cell walls will yield by an outward bulging rather than be cracked or broken by such internal pressure. The soft rubber coating 30 of course will easily follow the bulging movement of the sheet metal without forming a leak therein. With ordinary molded hard rubber or other hard molded composition battery boxes such warping of the battery plates often causes a cell partition or end wall of the box to crack and spring a leak and thus cause a sudden failure of the battery.

Due to this feature of the battery box of this invention thinner separators may be used between the battery plates 40 and hence the internal resistance of the battery is considerably less than when ordinary thicker separators are used. Also the battery plates may be inserted in the cells pressed very snugly together and hence the active material thereon is better retained in place by the separators, which means that the battery will have a longer life.

The cell covers 50 may be of ordinary design and material, such as molded hard rubber. The soft rubber interior lining 30 of the cells permit these covers 50 to be very simply and snugly pressed into place when they are assembled. Thus there will be no small cracks between the cover and the cell walls for the molten sealing material 51 to leak through upon the plates while it is being applied.

While the form of embodiment of the present invention as herein disclosed, constitutes a preferred form, it is to be understood that other forms might be adopted, all coming within the scope of the claims which follow.

What is claimed is as follows:

1. A storage battery container comprising: a pressed sheet metal box having easy rounded interior corners throughout and having partitions therein forming a plurality of cell compartments therein, a plurality of metal beams of relatively small cross section each extending transversely through all of said cell compartments through spaced holes in said partitions and supported by said partitions in spaced relation to the container bottom to form battery-plate supports, and a resilient non-metallic insulating coating strongly bonded to and encasing said metal beams and other interior surfaces of said metal structure and sealing said holes in said partitions adjacent said beams.

2. A storage battery container comprising: a unitary seamless drawn sheet metal bottom portion having integral raised side portions around its periphery, a unitary sheet metal side wall portion bent to form four integral side walls and joined at its bottom edge to said raised side portions to form a box, a plurality of unitary sheet metal partitions fixed in said box and dividing same into cell compartments, a plurality of metal beams each extending transversely through apertures in said partitions and through all of said cell compartments in spaced relation to said container bottom to form battery-plate supports, and a resilient non-metallic insulating coating deposited upon and bonded to said metal beams and the other interior surfaces of said cell compartments and providing a leak-proof and acid-proof interior coating.

HARVEY D. GEYER.